(12) United States Patent
Slaughter et al.

(10) Patent No.: US 7,359,480 B2
(45) Date of Patent: Apr. 15, 2008

(54) NEUTRON INTERROGATION SYSTEM USING HIGH GAMMA RAY SIGNATURE TO DETECT CONTRABAND SPECIAL NUCLEAR MATERIALS IN CARGO

(75) Inventors: Dennis R. Slaughter, Oakland, CA (US); Bertram A. Pohl, Berkeley, CA (US); Arden D. Dougan, San Ramon, CA (US); Adam Bernstein, Palo Alto, CA (US); Stanley G. Prussin, Kensington, CA (US); Eric B. Norman, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 485 days.

(21) Appl. No.: 10/838,762

(22) Filed: May 3, 2004

(65) Prior Publication Data

US 2008/0002810 A1    Jan. 3, 2008

Related U.S. Application Data

(60) Provisional application No. 60/565,157, filed on Apr. 23, 2004.

(51) Int. Cl.
*G01N 23/04* (2006.01)

(52) U.S. Cl. .................. 378/57; 378/62; 250/390.04
(58) Field of Classification Search .............. 378/57, 378/62; 250/390.04
See application file for complete search history.

(56) References Cited

U.S. PATENT DOCUMENTS

| 5,278,418 | A | * | 1/1994 | Broadhurst | 250/390.04 |
| 5,479,023 | A | * | 12/1995 | Bartle | 250/390.04 |
| 5,838,759 | A | * | 11/1998 | Armistead | 378/57 |
| 6,344,818 | B1 | | 2/2002 | Markov | |
| 6,347,132 | B1 | | 2/2002 | Annis | |

OTHER PUBLICATIONS

Slaughter, D., "Screening Cargo Containers," Science and Technology Review, Lawrence Livermore National Laboratory, May 2004, pp. 12-15.

* cited by examiner

*Primary Examiner*—Chester T. Barry
(74) *Attorney, Agent, or Firm*—Eddie E. Scott; John H. Lee (57) ABSTRACT

A system for inspecting cargo for the presence of special nuclear material. The cargo is irradiated with neutrons. The neutrons produce fission products in the special nuclear material which generate gamma rays. The gamma rays are detecting indicating the presence of the special nuclear material.

47 Claims, 5 Drawing Sheets

NEUTRON INTERROGATION SYSTEM USING HIGH GAMMA RAY SIGNATURE TO DETECT CONTRABAND SPECIAL NUCLEAR MATERIALS IN CARGO

CROSS-REFERENCE TO RELATED APPLICATION

This application claims priority to U.S. Provisional Patent No. 60/565,157 by Dennis R. Slaughter, Bertram A. Pohl, Arden D. Dougan, Adam Bernstein, Stanley G. Prussin, and Eric B. Norman filed Apr. 23, 2004 and titled "Neutron Interrogation System Using High Gamma Ray Signature to Detect Contraband SNM in Cargo." The disclosure of U.S. Provisional Patent No. 60/565,157 filed Apr. 23, 2004 is hereby incorporated by reference herein in its entirety for all purposes.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to detection systems and more particularly to a detection system using high gamma ray signature to detect contraband special nuclear materials in cargo.

2. State of Technology

U.S. Pat. No. 6,344,818 to Yuri Markov Feb. 5, 2002 for apparatus and method for the detection of materials provides the following state of technology information, "The ability to detect the presence of a material in any location is a requirement in many disciplines and industries. Determining if a particular material in large or small quantities is present at any location is a concern in medicine, research, exploration forensics, security, law enforcement, and for safety reasons. For example, at points of entry for national borders, and at some complexes, and buildings it can be necessary that contents of baggage and boxes and other such cargo containers be identifiable by inspection or detection methods when searching for contraband such as narcotics, stolen goods, unauthorized medicines and plants explosives and accelerants, liquids, chemicals, and other materials."

U.S. Pat. No. 6,347,132 to Martin Annis issued Feb. 12, 2002 for an x-ray inspection system for automatically detecting nuclear weapons materials provides the following state of technology information, "The detection of contraband (e.g., explosives and drugs) in closed containers is of growing importance worldwide. World events have necessitated tighter screening requirements for the contents of containers placed on aircraft to detect the presence of explosives. In addition, to combat the illegal flow of narcotics across national borders, the contents of containers, such as loaded trucks and vehicles must be inspected to check for the presence of narcotics. High energy x-ray inspection systems remain one of the only technologies capable of inspecting loaded cargo containers and vehicles. There is also a need to inspect containers for nuclear grade weapons' materials. There is a growing concern that some of these materials may come into possession of terrorists, due to the relatively large volume of nuclear weapons grade materials stored worldwide. Detectors such as Geiger counters and gamma ray detectors are well known for detecting nuclear weapons materials. However, since Uranium does not emit a significant flux of gamma rays, it can not be detected by a gamma ray detector (e.g., a gamma ray detector mounted outside of the truck which contains the contraband)."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

In a press release, Jun. 27, 2002, US Senators Chuck Schumer (D-NY) and John Warner (R-VA) announced the introduction of the Anti Nuclear Terrorism Act of 2002. The legislation would provide desperately needed federal money to fund the research and development of sophisticated technology to detect nuclear devices which may be smuggled into US ports and across the nation's borders. The bill's passage would mean stricter cargo reporting standards, increased penalties for unreported cargo, more manual inspections of cargo and merchandise, the purchase of over 100 new mobile X-ray scanning devices, and over $250 million to develop new technology to detect nuclear materials.

Schumer and Warner discussed the risk of terrorists successfully placing a nuclear weapon onto a ship or a truck, and outlined the dire need for new technology to detect nuclear devices. Currently, weak inspection standards and poor detection technology means a terrorist group in possession of a nuclear device stands a decent chance of success at attempting to load the device onto a ship or a truck and bring that device directly into the city through the ports or through the city's bridges and tunnels.

"The idea of a truck containing a nuclear device in the center of our center is terrifying, but not impossible. It doesn't matter how good our airport security is if all it takes to bring a nuclear device right into midtown is putting it on a ship or bringing it in on a truck," Schumer said. "Right now, our ability to detect nuclear weapons brought in through our ports, bridges and tunnels is virtually zero. Once terrorists can get that kind of weapon right into the heart of our cities, God only knows what could happen. The longer it takes to put new detection technology at our ports and toll booths, the longer it takes to institute better inspection procedures, standards and techniques, and new Customs agents in place, the greater the risk. And this is not a risk any of us can afford to take."

"Homeland security is the nation's top priority, and defending our nation's 361 ports is essential," declared Warner. "Across the country we handle over 2 billion tons of domestic and international freight, and the majority of that is moved in containers. New York and Virginia handle a tremendous percentage of that freight and the fact is not more than 2 percent of it is inspected. With this legislation we plan to change that."

The present invention provides a system for inspecting cargo for the presence of special nuclear material. The cargo is irradiated with neutrons. The neutrons produce fission products in the special nuclear material which generate gamma rays. The gamma rays are detecting indicating the presence of the special nuclear material.

One embodiment of the present invention provides an apparatus for inspecting cargo for the presence of special nuclear material. A neutron generator is positioned to irradiate the cargo with neutrons. The neutrons produce fission products in the special nuclear material which generate gamma rays. A detector is positioned to detect the gamma rays thereby indicating the presence of the special nuclear material.

Another embodiment of the present invention provides an apparatus for inspecting cargo for the presence of special nuclear material. A neutron generator means irradiates the cargo with neutrons that produce fission products in special nuclear material and produce gamma rays. A detector means for detecting the gamma rays indicates the presence of the special nuclear material.

The present invention has use as a system for screening cargo shipments at US government installations, foreign US government or military installations, US ports of entry, foreign ports of origin for cargo shipments to the US, and elsewhere. The present invention has use as a system for cargo container inspection at borders, ports, weigh stations used by Highway Patrols, DHS (US Customs, Border Patrol, etc.) container inspections.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Figure 1:
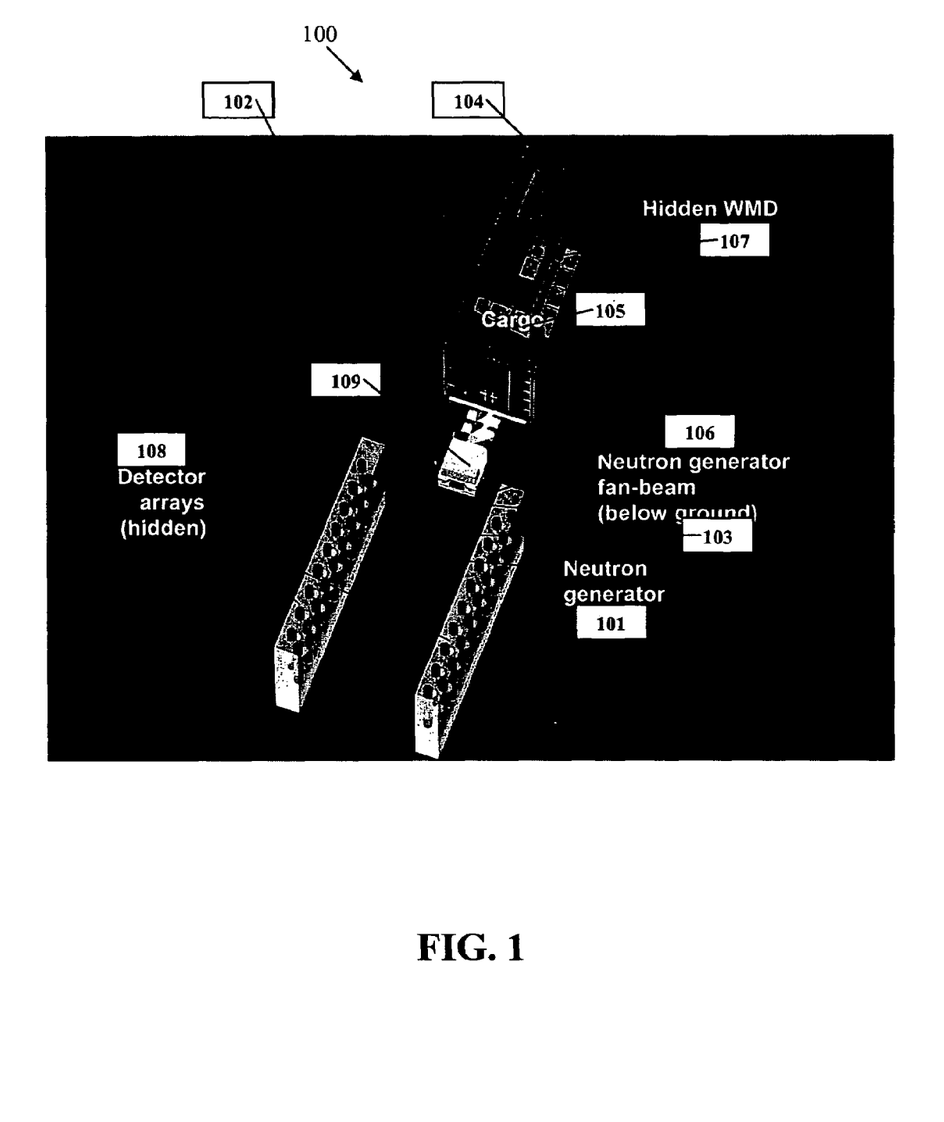
FIG. 1 illustrates a system for inspecting cargo for the presence of special nuclear material.

Referring now to FIG. 1, an embodiment of a system for inspecting cargo for the presence of special nuclear material is illustrated. The system is designated generally by the reference numeral 100. A significant amount of cargo is shipped into the US in containers. The largest volume of cargo entering the US is through the shipping ports, which receive about 6 million cargo containers each year. For example, the port of Los Angeles/Long Beach is one of the busiest ports in the US and received over three million cargo containers in 2001; approximately half of the total traffic arriving at US ports.

The rate of container arrivals at US ports is expected to increase dramatically over the coming decade. The West Coast ports of Los Angeles/Long Beach, Oakland, and Seattle are currently processing 11,000 containers per day, or 8 per minute on a 24/7 basis. With so many containers and a large volume and mass of cargo in each one it is clear that these containers provide an attractive venue for smuggling illicit material into the US, including weapons of mass destruction (WMD). Because successful delivery of just one such weapon can have catastrophic consequences it is essential that all cargo containers entering the US be screened with an extremely high probability of detecting any WMD hidden within. The cost of failure is very high. An OECD report (Maritime_Transport_Committee, "Security in maritime transport: Risk factors and economic impact", Organization for Economic Co-operation and Development (OECD); Directorate for Science, Technology and Industry, July, 2003) estimates that a successful WMD attack would shutdown the entire maritime shipping system for a period up to 10 days and this would produce economic costs in the US alone of up to 58 billion dollars.

The number of cargo containers is sufficiently large that the time available to do an inspection would have to be short, about one minute. Inspecting the millions of cargo containers that enter the US by truck, rail, ship or aircraft is a daunting task.

In the system 100, a container 104 is bathed in neutrons to actively search for nuclear materials. A well-collimated neutron generator 101 is located below ground 102 in a shielded cave 103. A truck carrying the container 104 is towed over the neutron generator 101 by a towing device 109. The cargo container 104 containing cargo 105 is drawn over a collimated beam 106 produced by the neutron generator 101. The container 104 is then towed through an array of detectors 108. The system 100 is much like driving through a carwash. If the neutrons encounter any fissile material the interaction of the neutrons would induce tiny fission reactions. These reactions would produce the telltale delayed gamma rays of nuclear materials. The telltale delayed gamma rays of nuclear materials are picked up by the array of detectors 108. The array of detectors 108 measures the gamma rays emitted. Fission products make numerous gamma rays that have comparable decay characteristics of delayed neutrons.

The beam 106 is a thin fan spanning the width of the container 104 and passes into the cargo 105 where it produces neutron capture and inelastic scatter γ-rays, and it produces fission in any SNM 107 that may be present. An array 108 of large, high-efficiency γ-ray and neutron detectors 109 covers both sides and the top and bottom of the container 104. Interaction of the neutrons with fissile material, SNM 107, inside the container 104 would produce fission, followed by delayed gamma rays detected by the array 108.

In one embodiment the detector array 108 is an array of liquid scintillators. The liquid scintillators have a fast response time. They are inexpensive instruments that will scan a large volume of material, which helps to ensure that a large fraction of the particle flux emitted by the neutron-irradiated nuclear material will be detected.

Interaction of the neutrons with fissile material, SNM 107, inside the container 104 produces fission as the container 104 moves through the system 100. The fission is followed by delayed gamma rays detected by the array 108. Gamma rays escaping from the container 104 through hydrogenous material is about 1,000 times greater than it is for delayed neutrons. The neutron beam 106 is pulsed and detector data is acquired both during the beam pulse and between beam pulses as illustrated generally by the numeral 200 in FIG. 2. The neutron beam 201 is turned ON (202) and OFF (203) in time (206). The SNM fission product decay is indicated by arrows 204 and the HE+CW neutron capture and elastic scattering γ-rays is indicated by arrows 205.

Figure 2:
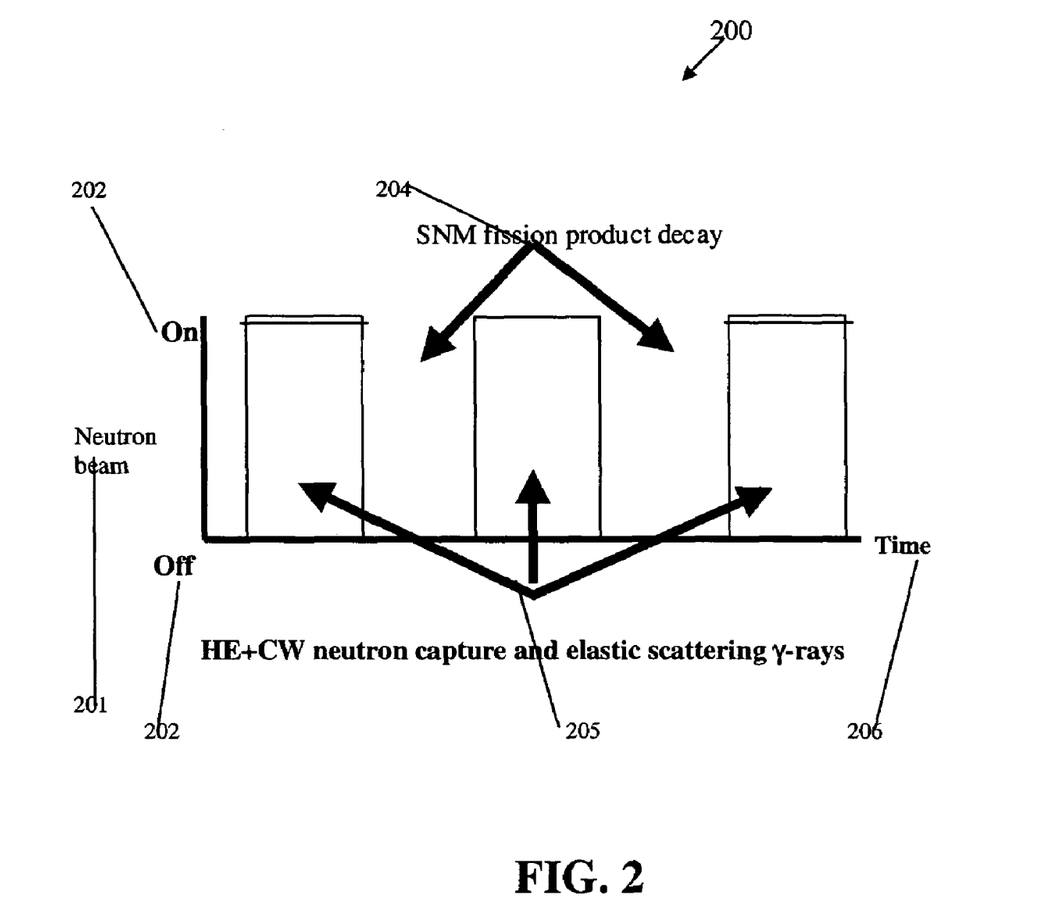
FIG. 2 illustrates data acquired both during the beam pulse and between beam pulses.

During the beam pulse neutron capture γ-rays are detected and analyzed spectroscopically. The characteristic emission lines of each chemical element are utilized to provide a chemical assay of the cargo materials. Elemental ratios of H, C, O, N, S, F, Cl and other elements are used to ascertain the possible presence of CW or HE. If the ratios fall within bounds characteristic of WMD an alarm is triggered that leads to further investigation and analysis.

Neutron interrogation also produces fission in any SNM 107 that may be hidden in the cargo 105. Some fission products decay between beam pulses emitting delayed high-energy γ-rays and delayed neutrons. The delayed high-energy γ-rays and neutrons are characterized with regard to their decay time to distinguish fission product emission from normal activation of cargo materials.

High-energy fission product γ-rays detected between beam pulses are used to identify the presence of SNM and are distinguished from activation and background sources by their high energies ($E_\gamma > 3$ MeV) and their characteristic decay times ($T_{1/2} \sim 20$ sec). The detector arrays 108 will routinely detect both neutrons and γ-rays emitted by any radioactive cargo whether or not interrogation is taking place. This system 100 provides a passive screening capability for materials emitting either neutrons or γ-rays without activating the neutron source.

It is first assumed that the container 104 is interrogated by a source of neutrons 101 at high energy (possibly 14 MeV) that is isotropic but collimated to reduce the neutron flux everywhere except for a small vertical band propagating across the width of the container. For a point isotropic neutron source of strength I, located distance $R_s$ from the target SNM and penetrating a thickness $R_c$ of cargo whose density is $\rho_c$ and neutron attenuation coefficient is $(\mu_n/\rho_\square)$, the flux of neutrons at the SNM target is estimated approximately below.

$$\Phi_{14} = \frac{I}{4\pi R_s^2} e^{-\left(\frac{\mu_n}{\rho_c}\right)\rho_c R_c} \quad (1)$$

Consider a cylindrical target of length L, radius r, density ρ, and mass M. Then, assuming a target thin enough to be considered transparent to 14 MeV neutrons, the fast fission rate due to 14 MeV neutrons is given by the following.

$$F_{14} = \Phi_{14} \pi r^2 L \frac{\rho N_o}{A_o} (\varepsilon \sigma_f^{25}(14 MeV) + (1-\varepsilon)\sigma_f^{28}(14 MeV)) \quad (2)$$

In the equation ε is the enrichment (fraction of $^{235}$U), superscripts 25 and 28 refer to $^{235}$U and $^{238}$U respectively, $N_o$ and $A_o$ are Avogadro's number and the mass number, respectively.

For thermal neutrons the target is definitely not transparent and, in fact, the thermal neutrons penetrate only a thin layer on the surface of a target. The depth of penetration depends on the enrichment, but the total mass of $^{235}$U illuminated by thermal neutrons is only weakly affected by enrichment. There is considerable uncertainty regarding the actual thermal neutron flux that will exist at the target location in experiments planned for the near future. To estimate this flux in a schematic way we assume an infinite medium of moderator where all fast neutrons that scatter are in equilibrium with thermal absorption, that is they will reach thermal energies and will be absorbed as thermal neutrons. In this simple model the thermal neutron absorption rate in the moderator is equal to the fast neutron scattering rate, represented in the relation below.

$$\sum_s^{14} \Phi_{14} \approx \sum_a^{th} \Phi_{th} \quad (3)$$

In the above model the ratio of thermal to fast neutron flux, β, is given by the ratio of cross sections.

$$\beta \equiv \frac{\Phi_{th}}{\Phi_{14}} \approx \frac{\sigma_s^{14}}{\sigma_a^{th}} \quad (4)$$

For water the ratio β=1.5.

In order to estimate the thermal fission rate it is assumed that fissions occur over the surface of the target cylinder and that the thermal neutron penetration depth is $$\lambda = 1/\sum T$$

where $$\sum T$$

is the total thermal neutron cross-section in the target material. The surface area assumed is that for a cylinder. Then the thermal fission rate is given below.

$$F_{th} = \sum_f^{th} \beta \Phi_{14}(2\pi r^2 + 2\pi rL)\lambda = \quad (5)$$

$$\beta \Phi_{14} 2\pi r^2 \left(1 + \frac{L}{r}\right) \frac{\varepsilon \sigma_f^{25}(th)}{\varepsilon \sigma_T^{25}(th) + (1-\varepsilon)\sigma_T^{28}(th)}$$

Evaluation of Eqs. 1 thru 5 for targets consisting of solid cylinders of $^{235}$U with L=2r=4 cm (a 1 kg cylinder), assuming $I=10^{11}$ n/s, $R_s=2$ m, $R_d=1.5$ m, the cargo is water at $\rho R_c=60$ gm/cm$^2$, and taking the known cross sections one predicts a thermal neutron flux at the target roughly $1.5\times10^5$ n/cm$^2$/sec and fast flux $1\times10^5$ n/cm$^2$/sec that leads to the following fission rates.

TABLE 1

Fission rates in cylindrical targets of $^{235}$U (fissions/sec)

|  | 1 kg target of $^{235}$U | 200 gm target of $^{235}$U |
|---|---|---|
| 14 MeV fission rate | $4.2 \times 10^5$ | $8.0 \times 10^4$ |
| Thermal fission rate | $4.4 \times 10^6$ | $1.6 \times 10^6$ |
| Total fission rate | $4.8 \times 10^6$ | $1.7 \times 10^6$ |

The above analysis can be continued to predict γ-ray fluxes exiting the cargo container. Taking the above estimate of fission rate the γ-ray flux on a detector at the cargo container wall is approximately given below.

$$\Phi_\gamma = \frac{F_{tot} Y_\gamma e^{-\left(\frac{\mu_\gamma c}{\rho_c}\right)\rho_x R_x}}{4\pi R_d^2} \quad (6)$$

Where $F_{tot}$ is the sum of thermal and fast fission rates, $Y_\gamma$ the high-energy or "signal" γ-ray yield per fission, $R_d$ the distance from the target to the detector, and $\mu_\gamma$ the γ-ray attenuation coefficient. Of course a large and highly efficient detector extending over a significant length of the cargo container improves the count rates. In this case $R_d$ may extend over a considerable range and that variation must be corrected for. For this case we replace $1/R^2$ by its mean value and neglect the effect of extending attenuation paths in the cargo. The mean value of $1/r^2$ for a wall of length L is given below.

$$\left\langle \frac{1}{r^2} \right\rangle = \frac{1}{R^2}\left[\frac{2R}{L}\tan^{-1}\left(\frac{L}{2R}\right)\right] \quad (7)$$

Utilizing the evaluations above with $R_d=1.5$ m, the relevant attenuation coefficient for water at $\mu_\gamma R_c=60$ gm/cm$^2$ and the yield values from Table 1 the γ-ray flux at the detector is given in the table below.

TABLE 2

High-energy γ-ray flux at the wall of a cargo container

|  | 1 kg $^{235}$U target | 1 kg $^{239}$Pu target |
|---|---|---|
| $\Phi_\gamma$(γ/cm$^2$sec) | 0.5 | 0.25 |
| Count rate in 20 ft long, 10% efficient detector (counts/sec) | $3.7 \times 10^4$ | $1.8 \times 10^4$ |

Note that the count rate for the 20 ft long detector was corrected using Eq. 7, but the additional attenuation due to oblique pathways in the cargo were not corrected. The count rate predicted is adequate for reliable scanning in reasonably short duration interrogation at the assumed fast flux.

The γ-ray fluxes correspond to beam-on or beam-equilibrium conditions. Of course the flux and count rate will decay between beam pulses so the indications in Table 2 are only approximate. Effects of decay between beam pulses will be predicted in a later section and those effects will lead to an optimized beam structure that maximizes the detected signal.

The detector array has a relatively fast time response, ~100 ns or better, so that neutrons or γ-rays that are emitted as part of a fission chain can be identified from the multiplicity of events in the area at high count rates. This is an important capability that can detect significant neutron multiplication in an SNM assembly that would distinguish it clearly from legitimate cargo contents that may include natural uranium. The scintillators can detect fast neutrons from their scattering in the detector and also can detect thermal neutrons as they are captured in the Gd that is also loaded into the liquid scintillation material. The thermal neutron capture produces a very distinctive γ-ray cascade depositing a total of approximately ~8 MeV in the detector. Similarly, γ-rays emitted during fission chain events may lead to large multiplicity of γ-ray events in the array.

Since the array is subdivided into many elements forming pixels with dimensions ~30 cm, the acquired data contains information on the location of the target in the cargo container. As the induced radiation source scans along the detector array its position along the length of the container can be determined to within a few tens of cm.

Finally, the detector array can be used even if active neutron interrogation of the cargo is not called for. It can be used without the neutron source to scan for large amounts of radioactive material present in a cargo. The neutron and γ-ray sensitivity is very high so that small amounts of radioactivity can be detected. In addition, the array is segmented so that some indication of the location or spatial extent of the radioactive material can be obtained from the count rates in multiple array elements. Establishing the geometrical extent of the radioactive material would help to distinguish a cargo with small amounts of uranium distributed throughout from the normal cargo with a small SNM component hidden in it.

The high-energy γ-ray signature produced by SNM has several principal characteristics that distinguish it from either natural background radiation sources or from the radioactivity produced during neutron interrogation of cargo. They are:

High energy. Significant γ-ray intensity is produced at energies in the range 3-7 MeV. There is essentially no natural radioactivity that produces γ-radiation above approximately 2.5 MeV. Neutron interrogation produces many high-energy γ-rays from (n, γ) reactions with species in the cargo and the environment, but they are not produced in between beam pulses. Finally, a high-energy neutron beam can produce activation reactions such as (n,2n), (n,p), and (n,α) on cargo and environmental nuclides that subsequently emit high-energy γ-rays but nearly all of these species are long-lived compared to the fission products, as seen in the table below. These reactions can produce interferences, but most interferences can be eliminated by reducing beam energy, as the table below shows. To first order the fission product γ-rays are unique in their high energies.

There are a number of short-lived background and/or activation products that could interfere with identifying the SNM signature radiation. Table 3 below summarizes the nuclides of greatest concern.

TABLE 3

Neutron activation products with short half-lives

| Product Nuclide | Reaction | Eγ (MeV) | Half Life (sec) | Iγ (abs) | Ig (>2.0 MeV) | Thresh (MeV) | Target % abund |
|---|---|---|---|---|---|---|---|
| $^{15}$C | $^{18}$O(n, a) | 5.3 | 2.4 | 0.63 | | 5.29 | 0.2 |
| $^{16}$N | $^{16}$O(n, p) | 6.1 7.1 | 7.1 | 0.67 0.049 | | 10.25 | 99.8 |
| $^{26}$Na | $^{26}$Mg(n, p) | 2.52 2.54 | 1.1 | | .070 > 2.0 | 8.86 | 11 |
| $^{30}$Al | $^{30}$Si(n, p) | 2.23 2.6 3.5 | 3.6 | | 1.05 > 2.0 | 8.04 | 3.1 |
| $^{44}$K | $^{44}$Ca(n, p) | 2.15 2.52 3.66 | 1326 | | >0.4 | 4.99 | 2.09 |
| $^{37}$S | $^{36}$Ar(n, γ) $^{40}$Ar(n, a) | 3.1 | 300 | 0.94 | | 0 2.56 | 0.34 99.6 |

Short and relatively unique decay times. There are a wide range of fission products produced and many of them have short half-lives, i.e., in the range 0.5-100 seconds. Natural backgrounds are necessarily constant and the activated materials produced by interrogation are mostly long-lived with half-lives of minutes to years. Here too the fission product D-rays are distinct from most interfering sources by their short half-lives.

Temporal nature of the scanning process. Physical scanning of an SNM target through a collimated neutron beam at a known velocity provides a unique temporal dependence in the "signature" radiation. The known temporal shape of this response is unique and can be used to distinguish it from background and other interfering sources.

Figure 3:
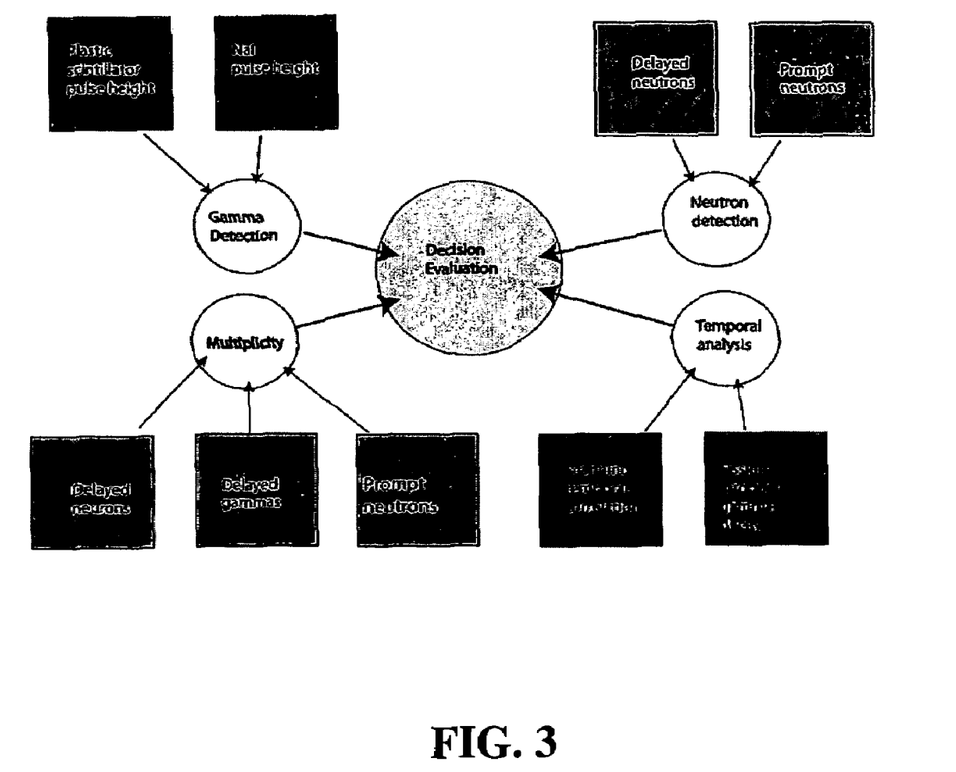
FIG. 3 shows the many sources of information that can be combined.

In addition to the above it is anticipated that neutron events will be detected, including those due to delayed fission neutrons, and will be distinguished by the detector arrays deployed. This information can be used together with the γ-ray data to make decisions about the possible presence of SNM in a given cargo container. If a significant amount of SNM is present then there is a possibility of neutron multiplication that produces chains of fission events. Those chains will appear as chains of both neutron and γ-ray production, and the signature would be non-Poisson deviations in the normal counting statistics of both the γ-ray and the neutron detectors. So, there are many sources of information that can be combined coherently in an Expert System to provide a high degree of confidence in the system decision that might not be warranted from any one information source alone. These information sources are visualized in FIG. 3.

The pulse structure of an interrogating beam should be optimized for maximum reliability with minimum interrogation time. This requires the maximum count rate of detected "signature" events while minimizing the count rate due to interfering events. For detection of CW during the beam pulse the optimum is a continuous beam without beam-off intervals. However, that would not allow detection of the delayed SNM radiation from fission products. To address the optimization of delayed radiation detection we assume a train of pulses with duration τ and interval T where delayed radiation is counted only during the beam-off interval.

If there were only one pulse with duration τ and a single counting interval immediately following with duration T τ, then the number of decays during the counting interval is given below, where P is the production rate of the nuclide of interest during the beam pulse and τ τ is its decay constant.

$$C_1 = \frac{P}{\lambda}(1 - e^{-\lambda \tau})(1 - e^{-\lambda(T-\tau)}) \quad (8)$$

If there is a train of N pulses, beginning with no fission products, it can be shown that the total number of decays during the N subsequent counting intervals is given below.

$$C_N = \frac{C_1}{(1 - e^{-\lambda T})^2}[N - (N+1)e^{-\lambda T} + e^{-(N+1)\lambda T}] \quad (9)$$

Using the relation in Eq. 9 it is possible to optimize the beam duty factor, τ/T, to provide the maximum number of counts.

The present invention provides a system for sensitive and reliable detection of Special Nuclear Material (SNM) concealed in cargo shipments. It utilizes a directed and medium energy (2-8 MeV) neutron beam to irradiate cargo shipments. Medium energy neutrons (2-8 MeV) are utilized to provide enhanced cargo penetration (compared to low energy beams) and reduced activation of cargo materials that would interfere with detection (compared to high energy beams.

The interrogating neutron beam is produced by the reaction of medium energy (1-5 MeV) deuterons or protons in a target of deuterium, beryllium, or lithium to produce an intrinsically directed beam of neutrons, and with neutron beam energy range 2-8 MeV. The relatively high energy of the deuteron or proton beam provides kinematic collimation of the output without reliance on collimators or additional shielding.

The interrogating neutrons thermalize in the cargo producing fission in any SNM that may be present there. A neutron beam in the 2-8 MeV range, produced by reactions among light nuclei such as the D-D reaction at deuteron energies in the range 1-5 MeV is kinematically collimated in the forward direction. This is a simple physical process that doesn't require extensive material collimation and limits the beam production to a half-angle of only ~15 degrees, thus focusing the beam on the cargo and reducing the need for shielding and collimation. More importantly, a forward directed beam increases the useful neutron flux on the target and reduces the need for high current accelerators to produce this beam, thus reducing cost and improving reliability. Neutron beams in the 2-8 MeV range are much more penetrating than low energy beams (<1 MeV) and are required to interrogate fully loaded cargos whose thicknesses are in the range 10-75 gm/cm2. At the same time this beam energy is low enough to avoid damaging cargos by activation of their contents.

Fission products produced by the fission of SNM undergo b-decay with a wide range of decay half-lives ranging from 0.1 sec to years. Those of interest decay with half-lives in the range 5-200 sec and Applicants find the most useful focus in this concept is on the fission products whose half-lives are in the neighborhood 20-30 sec. Some of their b-decays lead to highly excited states that decay by emission of g-rays at high energy, i.e., E γ>3 MeV. This is important because there is essentially no natural radioactive background at this high energy and that radiation is a distinctive characteristic of fission and thus the presence of SNM concealed in the cargo. In addition, the 20-30 sec half-life of the emitters being detected is distinct from other activation products that may be produced in cargo materials being interrogated by the neutron probe. This γ-ray signature of SNM is unique both in its energy and its decay time. Equally important, γ-rays at this high energy penetrate most cargo materials readily so that detectable fluxes are adequate even for thick and dense cargos. Overall, the high-energy g-ray yield from fission is approximately 10× higher than the delayed neutron emission used for this purpose previously. And the attenuation of the γ-rays is only ~10× in thick hydrogenous cargos whereas for delayed neutrons the attenuation is ~100-1000×. Similar conclusions are reached for cargos consisting of other materials such as electronics or machinery.

High efficiency γ-ray detectors work well in detection of the signature described above. That's because the high energy and unique decay half-lives remove the requirement for high-resolution spectroscopy. Inexpensive and large detectors can be utilized. This permits large arrays of pixilated plastic scintillators to be deployed inexpensively to detect this signal. The concept described here utilizes long linear arrays of detectors covering the full length of at least two sides of a cargo container.

Fission product γ-rays characteristic of induced fission in the SNM are detected in a large, pixilated, linear array of detectors to provide both high detection efficiency and to locate the contraband SNM in the cargo.

The fission product g-radiation is detected after significant delay, 10-30 sec. Temporal processing of the detected signals is utilized to suppress background response and to enhance the characteristic SNM signature compared to interfering sources. This is done by: a) monitoring the decay time of the high-energy radiation, and b) to cross-correlate many pairs of detector elements to determine whether a highly localized radiation source is propagating along the array as the cargo container scans past. If there is evidence of a propagating source, and the speed corresponds to the container scan speed, then this provides another indication of possible SNM presence. The temporal analysis is utilized to suppress radiation background interferences and to reduce the sensitivity to interfering radiation due to environmental or cargo activation.

Figure 4:
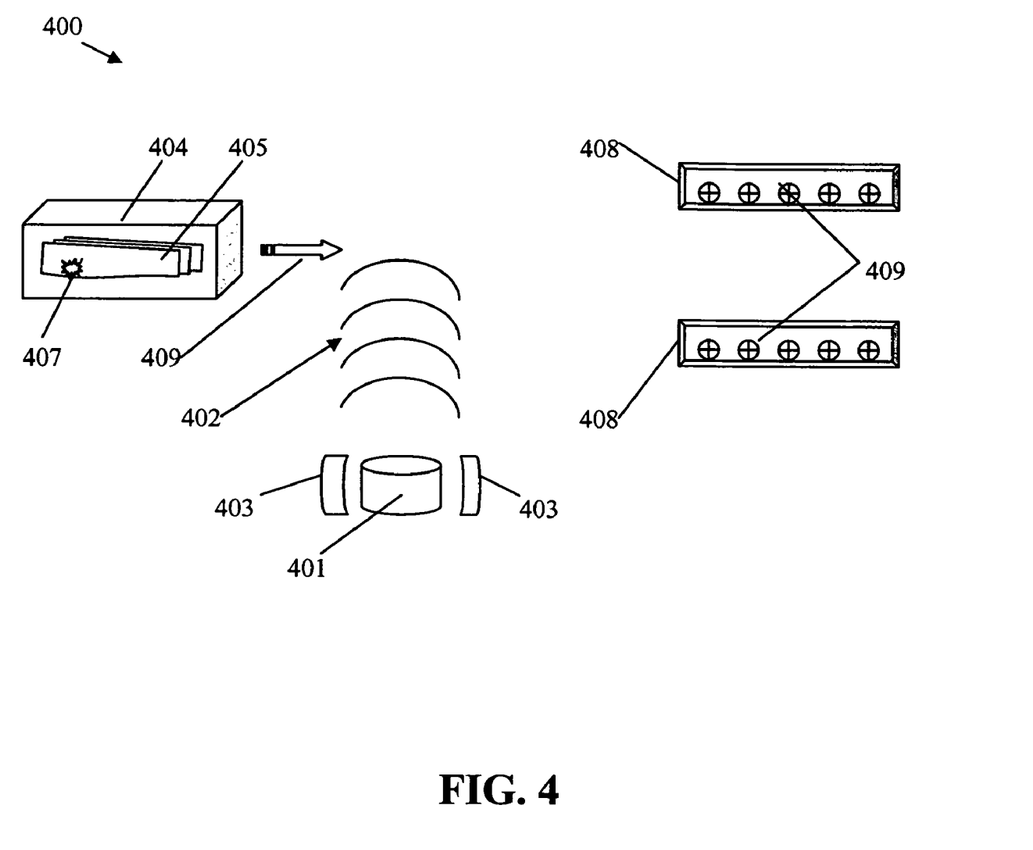
FIG. 4 illustrates another embodiment of a system for inspecting cargo for the presence of special nuclear material.

Referring now to FIG. 4, another embodiment of a system for inspecting cargo for the presence of special nuclear material is illustrated. The system is designated generally by the reference numeral 400. A container 404 containing cargo 405 is bathed in neutrons by a neutron generator 401. The neutron generator is shielded by shielding 403. The container 404 is moved past the neutron generator 401 by a suitable device 409. Alternatively, the neutron generator 401 can be moved along the container 404.

The container 404 is then moved through an array of detectors 408. If the neutrons encounter any fissile material the interaction of the neutrons induces tiny fission reactions. These reactions produce telltale delayed gamma rays of nuclear materials. The telltale delayed gamma rays of nuclear materials are picked up by the array of detectors 408. The array of detectors 408 measures the gamma rays emitted. Fission products make numerous gamma rays that have comparable decay characteristics of delayed neutrons.

The array 408 contains individual large, high-efficiency B-ray and neutron detectors 409. Interaction of the neutrons with fissile material such as Special Nuclear Material (SNM) 407, inside the container 404 produces fission, followed by delayed gamma rays detected by the array 408. Interaction of the neutrons with fissile material SNM 407 inside the container 404 produces fission as the container 404 moves through the system 400. The fission is followed by delayed gamma rays detected by the array 408. The neutron beam 406 is pulsed and detector data is acquired both during the beam pulse and between beam pulses. Gamma rays escaping from the container 404 through hydrogenous material is about 1,000 times greater than it is for delayed neutrons.

During the beam pulse neutron capture γ-rays are detected and analyzed spectroscopically. The characteristic emission lines of each chemical element are utilized to provide a chemical assay of the cargo materials. Elemental ratios of H, C, O, N, S, F, Cl, P and other elements are used to ascertain the possible presence of CW or HE. If the ratios fall within bounds characteristic of WMD an alarm is triggered that leads to further investigation and analysis.

Neutron interrogation also produces fission in any SNM 407 that may be hidden in the cargo 405. Some fission products decay between beam pulses emitting delayed high-energy γ-rays and delayed neutrons. The delayed high-energy γ-rays and neutrons are characterized with regard to their decay time to distinguish fission product emission from normal activation of cargo materials.

High-energy fission product γ-rays detected between beam pulses are used to identify the presence of SNM and are distinguished from activation and background sources by their high energies ($E_\gamma$>3 MeV) and their characteristic decay times ($T_{1/2}$~20 sec). The detector arrays 408 will routinely detect both neutrons and γ-rays emitted by any radioactive cargo whether or not interrogation is taking place. This system 400 provides a passive screening capability for materials emitting either neutrons or γ-rays without activating the neutron source.

The cargo container screening system 400 provides detection of fissionable material 407 hidden in cargo containers 404. The system 400 makes use of a neutron beam 402 for producing fission; and the detection of the abundant high-energy γ-rays emitted in the β-decay of short-lived fission products and β-delayed neutrons. The abundance of the delayed γ-rays is almost an order of magnitude larger than that of the delayed neutrons normally used to detect fission and they are emitted on about the same time scale as the delayed neutrons, i.e., ~1 min. The energy and temporal distributions of the delayed γ-rays provide a unique signature of fission.

Because of their high energy, these delayed γ-rays penetrate low-Z cargoes much more readily than the delayed neutrons. Coupled with their higher abundance, the signal from the delayed γ-rays escaping from the container 404 is predicted to be as much as six decades more intense than the delayed neutron signal, depending upon the type and thickness of the intervening cargo 405.

The γ-rays are detected in a large array 408 of scintillators 409 located along the sides of the container 404 as it is moved through them. Measurements have confirmed its signal strength in somewhat idealized experiments and have also identified one interference when 14.5 MeV neutrons from the D, T reaction are used for the interrogation. The interference can be removed easily by the appropriate choice of the neutron source 401.

The system 400 utilizes detection of distinctive γ-ray signature following neutron-induced fission to detect SNM 407 hidden in the cargo container 404. The 101 generator is a neutron generator that produces a directed and medium energy neutron beam produced by the reaction of medium energy deuterons or protons in a target of deuterium, beryllium, or lithium. In the system 400, the neutrons are produced by the neutron generator 401; however, it is to be understood that the use of a neutron beam is only one embodiment of the present invention. In other embodiments, a high-energy photon source (E τ>6 MeV) is used as the irradiation source 401 with similar effect.

Figure 5:
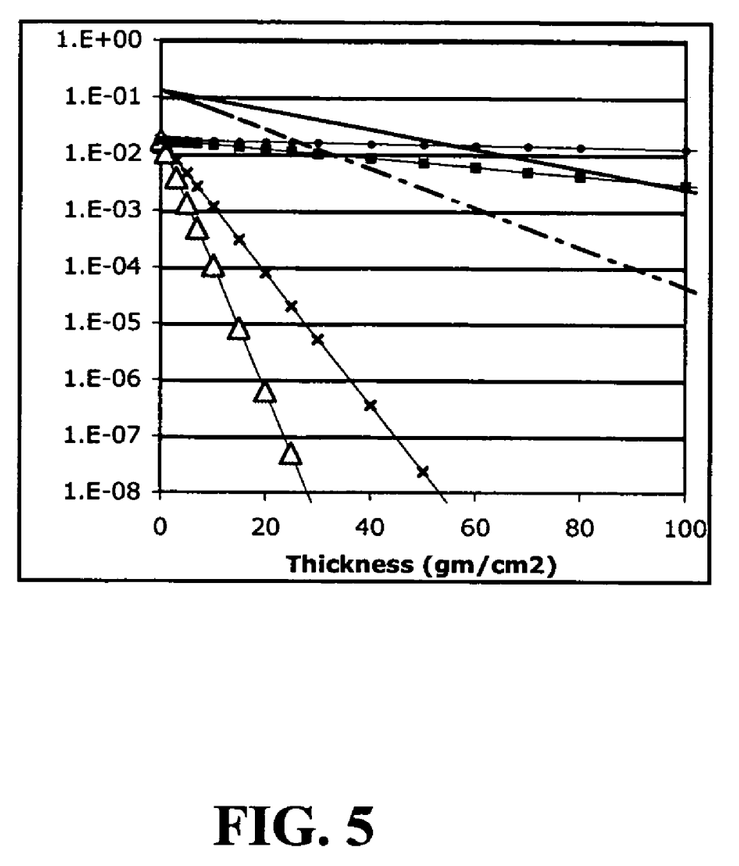
FIG. 5 is a graph that shows attenuation of neutrons and high-energy gamma rays in various media.

Monte Carlo simulations were used to determine the effective attenuation coefficients for neutrons and γ-rays in various substances including aluminum, water, wood, and lead. Attenuation of neutrons and high-energy γ-rays in various media is illustrated in FIG. 5. Solid line is 3 MeV γ-rays in water. Dot-dash line is 3 MeV γ-rays in Pb. Solid circles are 300 keV neutrons in Pb, Boxes are 300 keV neutrons in Al. X is 300 keV neutrons in wood. Triangles are 300 keV neutrons in water. High-energy γ ray intensity escaping the cargo exceeds the delayed neutron intensity for all materials to a thickness of ~30 gm/cm². In the case of hydrogenous materials such as wood and water the γ radiation escaping the cargo greatly exceeds the neutron intensity. The actual benefit in using this signature depends on the type of material and its thickness, but can range up to six orders of magnitude. At ~60 gm/cm², a typical half-thickness for a fully loaded cargo container, the attenuated γ radiation exceeds the neutron intensity by more than four orders of magnitude. Conversely, if the intervening material is a metal such as aluminum or lead the neutron penetration is good and exceeds the γ-ray intensity for thickness exceeding 40-80 gm/cm² of metal. Thus the concept proposed above includes detection of both neutrons and high-energy γ radiation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus for inspecting a cargo container for the presence of special nuclear material wherein the cargo container's top and bottom have a width and the cargo container's sides have a height, comprising:
    a neutron generator that produces a collimated neutron beam adapted to span the cargo container's width,
    said neutron generator adapted to be positioned below the cargo container's bottom,
    said collimated neutron beam positioned to span the cargo container's width and irradiate the cargo container with neutrons that produce fission products in the special nuclear material, said fission products producing gamma rays, and
    a detector,
    said detector positioned to cover the cargo container's sides and detect said fission products producing gamma rays indicating the presence of the special nuclear material.

2. The apparatus for inspecting cargo for the presence of special nuclear material of claim 1 wherein said detector is an array of liquid scintillators.

3. The apparatus for inspecting cargo for the presence of special nuclear material of claim 1 wherein said detector is a detector that detects delayed high-energy gamma rays produced by said fission products.

4. The apparatus for inspecting cargo for the presence of special nuclear material of claim 1 wherein said detector is a detector that detects gamma rays having high energies, ($E_\gamma$>3 MeV).

5. The apparatus for inspecting cargo for the presence of special nuclear material of claim 1 wherein said detector is a detector that detects gamma rays having high energies, ($E_\gamma$>3 MeV), and decay times, ($T_{1/2}$~20 sec), produced by said fission products.

6. The apparatus for inspecting cargo for the presence of special nuclear material of claim 1 wherein said generator is a neutron generator that produces a directed and medium energy neutron beam.

7. The apparatus for inspecting cargo for the presence of special nuclear material of claim 1 including shielding positioned to shield said neutron generator that produces a collimated neutron beam adapted to span the cargo container's width.

8. The apparatus for inspecting cargo for the presence of special nuclear material of claim 1 wherein said generator is a neutron generator that produces a directed and medium energy neutron beam of 2 to 8 MeV.

9. The apparatus for inspecting cargo for the presence of special nuclear material of claim 1 wherein said generator is a neutron generator that produces pulsed neutrons.

10. The apparatus for inspecting cargo for the presence of special nuclear material of claim 1 wherein said generator is a neutron generator that produces a directed and medium energy neutron beam produced by the reaction of medium energy deuterons or protons in a target of deuterium, beryllium, or lithium.

11. The apparatus for inspecting cargo for the presence of special nuclear material of claim 1 wherein said generator is a neutron generator that produces a directed and medium energy neutron beam of 1 to 5 MeV produced by the reaction of medium energy deuterons or protons in a target of deuterium, beryllium, or lithium.

12. The apparatus for inspecting cargo for the presence of special nuclear material of claim 1 wherein said detector is a detector that detects fission products with half-lives in the range of 5-200 sec.

13. The apparatus for inspecting cargo for the presence of special nuclear material of claim 1 wherein said detector is a detector that detects fission products with half-lives in the range of 20-30 sec.

14. The apparatus for inspecting cargo for the presence of special nuclear material of claim 1 wherein said detector comprises a scintillator.

15. The apparatus for inspecting cargo for the presence of special nuclear material of claim 1 wherein said detector comprises a large array of pixilated plastic scintillators.

16. The apparatus for inspecting cargo for the presence of special nuclear material of claim 1 wherein the cargo has two sides and wherein said detector comprises long linear arrays of detectors covering the full length of said two sides of said cargo container.

17. The apparatus for inspecting cargo for the presence of special nuclear material of claim 1 wherein said detector detects signals representing said fission products and provides temporal processing of said detected signals.

18. The apparatus for inspecting cargo for the presence of special nuclear material of claim 1 wherein said detector detects signals representing said fission products and provides temporal processing of said detected signals by monitoring the decay time of high-energy radiation from said fission products.

19. An apparatus for inspecting a cargo container for the presence of special nuclear material, wherein the cargo container is carried by a truck over the ground and wherein the cargo container's top and bottom have a width and the cargo container's sides have a height, comprising:
  a neutron generator that produces a collimated neutron beam adapted to span the cargo container's width,
  said neutron generator adapted to be positioned below the ground and below the cargo container's bottom,
  said collimated neutron beam positioned to irradiate the bottom of the cargo container and the cargo container with neutrons that produce fission products in special nuclear material and produce gamma rays, and
  a detector,
  said detector positioned to cover the cargo container's sides for detecting said gamma rays indicating the presence of special nuclear material.

20. The apparatus for inspecting cargo for the presence of special nuclear material of claim 19 wherein said detector is an array of liquid scintillators.

21. The apparatus for inspecting cargo for the presence of special nuclear material of claim 19 including a towing device adapted to tow the truck and the cargo container over said neutron generator so that said thin fan collimated neutron beam irradiates the cargo with neutrons that produce fission products in special nuclear material and produces gamma rays.

22. The apparatus for inspecting cargo for the presence of special nuclear material of claim 19 wherein said detector is a detector for detecting gamma rays having high energies, ($E_\gamma$>3 MeV).

23. The apparatus for inspecting cargo for the presence of special nuclear material of claim 19 wherein said detector is a detector for detecting gamma rays having high energies, ($E_\gamma$>3 MeV), and decay times, ($T_{1/2}$~20 sec), produced by said fission products.

24. The apparatus for inspecting cargo for the presence of special nuclear material of claim 19 wherein said generator is a neutron generator that produces a directed and medium energy neutron beam.

25. The apparatus for inspecting cargo for the presence of special nuclear material of claim 19 including shielding positioned to shield said neutron generator that produces a collimated neutron beam adapted to span the cargo container's width.

26. The apparatus for inspecting cargo for the presence of special nuclear material of claim 19 wherein said generator is a neutron generator that produces a directed and medium energy neutron beam of 2 to 8 MeV.

27. The apparatus for inspecting cargo for the presence of special nuclear material of claim 19 wherein said generator is a neutron generator that produces pulsed neutrons.

28. The apparatus for inspecting cargo for the presence of special nuclear material of claim 19 wherein said generator is a neutron generator that produces a directed and medium energy neutron beam produced by the reaction of medium energy deuterons or protons in a target of deuterium, beryllium, or lithium.

29. The apparatus for inspecting cargo for the presence of special nuclear material of claim 19 wherein said generator is a neutron generator that produces a directed and medium energy neutron beam of 1 to 5 MeV produced by the reaction of medium energy deuterons or protons in a target of deuterium, beryllium, or lithium.

30. The apparatus for inspecting cargo for the presence of special nuclear material of claim 19 wherein said detector is a detector that detects fission products with half-lives in the range of 5-200 sec.

31. The apparatus for inspecting cargo for the presence of special nuclear material of claim 19 wherein said detector is a detector that detects fission products with half-lives in the range of 20-30 sec.

32. The apparatus for inspecting cargo for the presence of special nuclear material of claim 19 wherein said detector comprises a scintillator.

33. The apparatus for inspecting cargo for the presence of special nuclear material of claim 19 wherein said detector comprises a large array of pixilated plastic scintillators.

34. The apparatus for inspecting cargo for the presence of special nuclear material of claim 19 wherein the cargo container has two sides and wherein said detector comprises long linear arrays of detectors covering the full length of said two sides of said cargo container.

35. The apparatus for inspecting cargo for the presence of special nuclear material of claim 19 wherein said detector detects signals representing said fission products and provides temporal processing of said detected signals.

36. The apparatus for inspecting cargo for the presence of special nuclear material of claim 19 wherein said detector detects signals representing said fission products and provides temporal processing of said detected signals by monitoring the decay time of high-energy radiation from said fission products.

37. A method of inspecting a cargo container for the presence of special nuclear material, wherein the cargo container is carried by a truck over the ground and wherein the cargo container's top and bottom have a width and the cargo container's sides have a height, comprising the steps of:
  positioning a neutron generator below the ground and below the cargo container's bottom in a position to direct a collimated neutron beam and irradiate the bottom of the cargo container and the cargo container with neutrons that produce fission products in special nuclear material and produce gamma rays, wherein said collimated neutron beam is adapted to span the cargo container's width,
  towing the truck and the cargo container over the ground and over said neutron generator,
  irradiating the cargo with neutrons that produce fission products in the special nuclear material and produce gamma rays,
  positioning a detector to cover the cargo container's sides, and
  detecting said gamma rays indicating the presence of the special nuclear material.

38. The method for inspecting cargo for the presence of special nuclear material of claim 37 wherein said step of detecting said gamma rays comprises detecting high gamma ray signatures of said fission products.

39. The method for inspecting cargo for the presence of special nuclear material of claim 37 wherein said wherein said step of detecting said gamma rays comprises detecting delayed high-energy gamma rays produced by said fission products.

40. The method for inspecting cargo for the presence of special nuclear material of claim 37 wherein said wherein said step of detecting said gamma rays comprises detecting gamma rays having high energies, ($E_\gamma$>3 MeV).

41. The method for inspecting cargo for the presence of special nuclear material of claim 37 wherein said step of detecting said gamma rays comprises detecting gamma rays having high energies, ($E_\gamma$>3 MeV), and decay times, ($T_{1/2}$~20 sec), produced by said fission products.

42. The method for inspecting cargo for the presence of special nuclear material of claim 37 wherein said step of irradiate the cargo with neutrons comprises utilizing a directed and medium energy neutron beam to irradiate the cargo.

43. The method for inspecting cargo for the presence of special nuclear material of claim 37 wherein said step of irradiate the cargo with neutrons comprises utilizing a directed and medium energy neutron beam of 2 to 8 MeV to irradiate the cargo.

44. The method for inspecting cargo for the presence of special nuclear material of claim 37 wherein said step of irradiate the cargo with neutrons comprises irradiate the cargo with pulsed neutrons.

45. The method for inspecting cargo for the presence of special nuclear material of claim 37 wherein said step of detecting said gamma rays comprises detecting fission products with half-lives in the range of 5-200 sec.

46. The method for inspecting cargo for the presence of special nuclear material of claim 37 wherein said step of detecting said gamma rays comprises detecting fission products with half-lives in the range of 20-30 sec.

47. The method for inspecting cargo for the presence of special nuclear material of claim 37 wherein said step of detecting said gamma rays comprises detecting signals representing said fission products and providing temporal processing of said detected signals by monitoring the decay time of high-energy radiation from said fission products.

* * * * *